United States Patent [19]

Takezaki

[11] Patent Number: 5,678,095
[45] Date of Patent: Oct. 14, 1997

[54] APPARATUS AND METHOD FOR RECORDING AND REPRODUCING THREE-DIMENSIONAL IMAGES

[75] Inventor: Koichi Takezaki, Kawasaki, Japan

[73] Assignee: Fujitsu Limited, Kawasaki, Japan

[21] Appl. No.: 37,377

[22] Filed: Mar. 26, 1993

[30] Foreign Application Priority Data

Mar. 26, 1992 [JP] Japan ..................... 4-067677

[51] Int. Cl.6 .......................... G03B 35/00; G03B 35/08
[52] U.S. Cl. .............................. 396/335; 396/322
[58] Field of Search ......................... 354/112, 114, 354/115, 110; 352/58; 396/322, 323, 335, 330, 337

[56] References Cited

U.S. PATENT DOCUMENTS

| 4,128,324 | 12/1978 | Seeger | 354/112 |
| 5,543,874 | 8/1996 | Winnek | 354/112 |

FOREIGN PATENT DOCUMENTS 55-129337 10/1980 Japan.
57-161738 10/1982 Japan.

Primary Examiner—Safet Metjahic
Assistant Examiner—Nicholas J. Tuccillo
Attorney, Agent, or Firm—Staas & Halsey

[57] ABSTRACT

An apparatus for recording and reproducing three-dimensional images comprises a non-transmittable or opaque surface having a plurality of transmission points at specified spaces, so that light from an object passes through them; a transmittable or transparent body which refracts the light from the transmission points; and a recording surface which records the light from the transmittable body. The apparatus is operative to record the light which has reached the recording surface as images, and to record the direction of the light in the form of a combination of information about each transmission point and the corresponding image. Also, the apparatus is operative to reproduce the recorded images, by illuminating the recording surface via the transmission points, with white light.

12 Claims, 15 Drawing Sheets

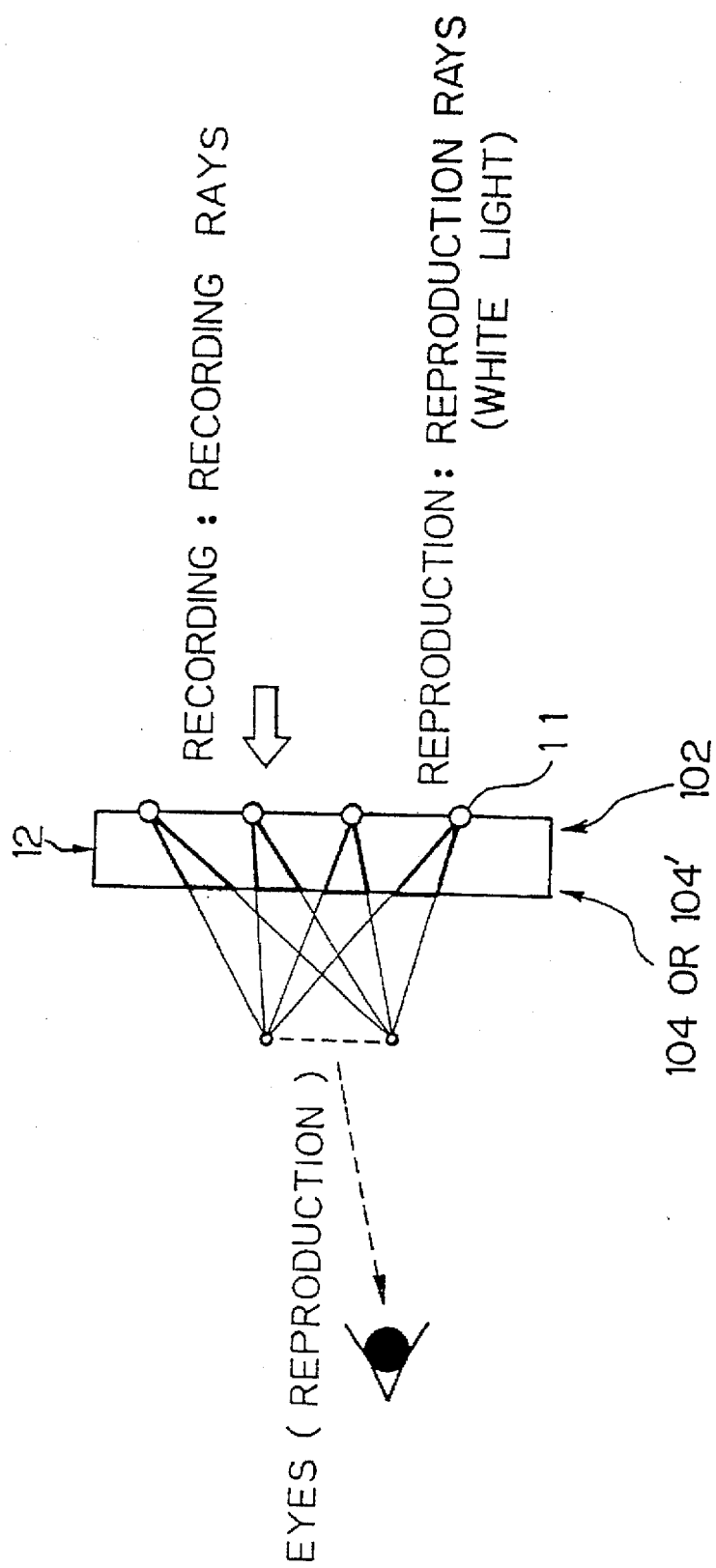

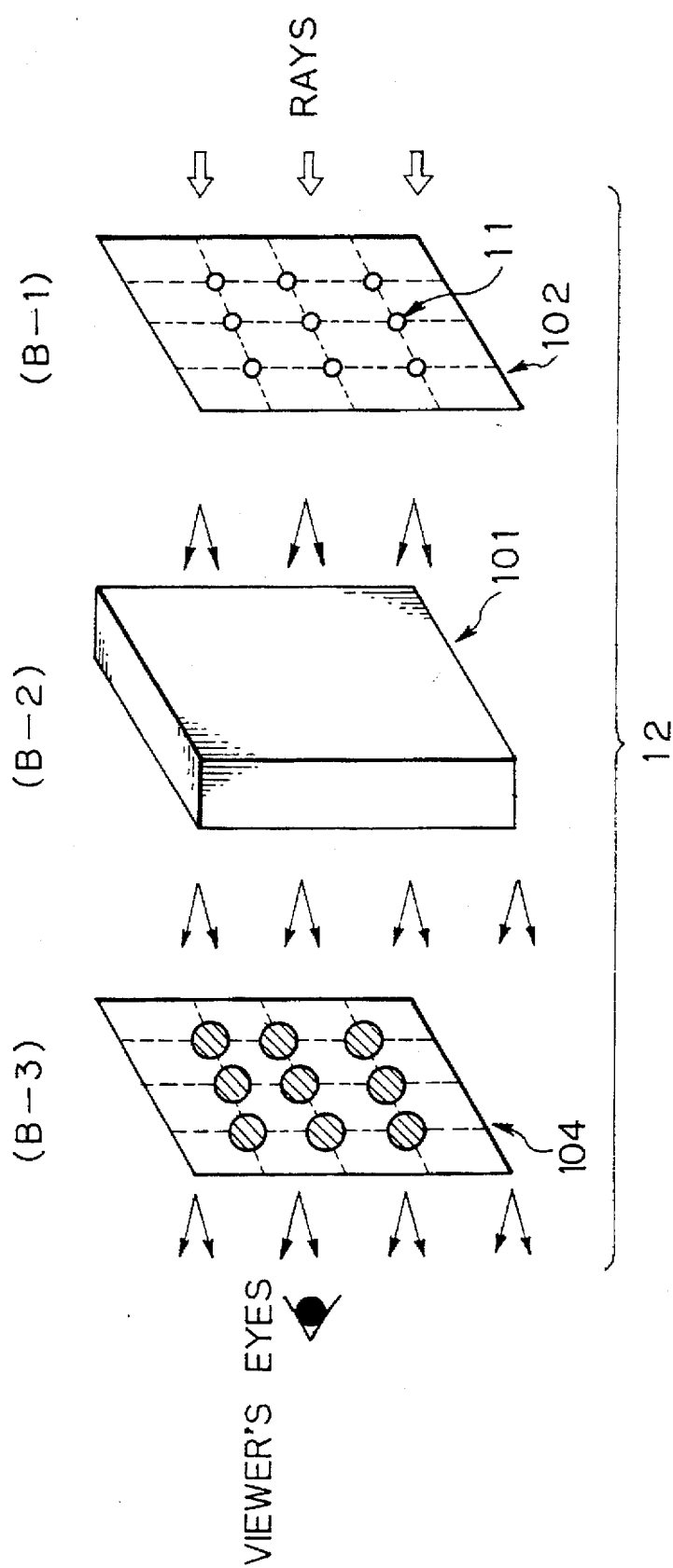

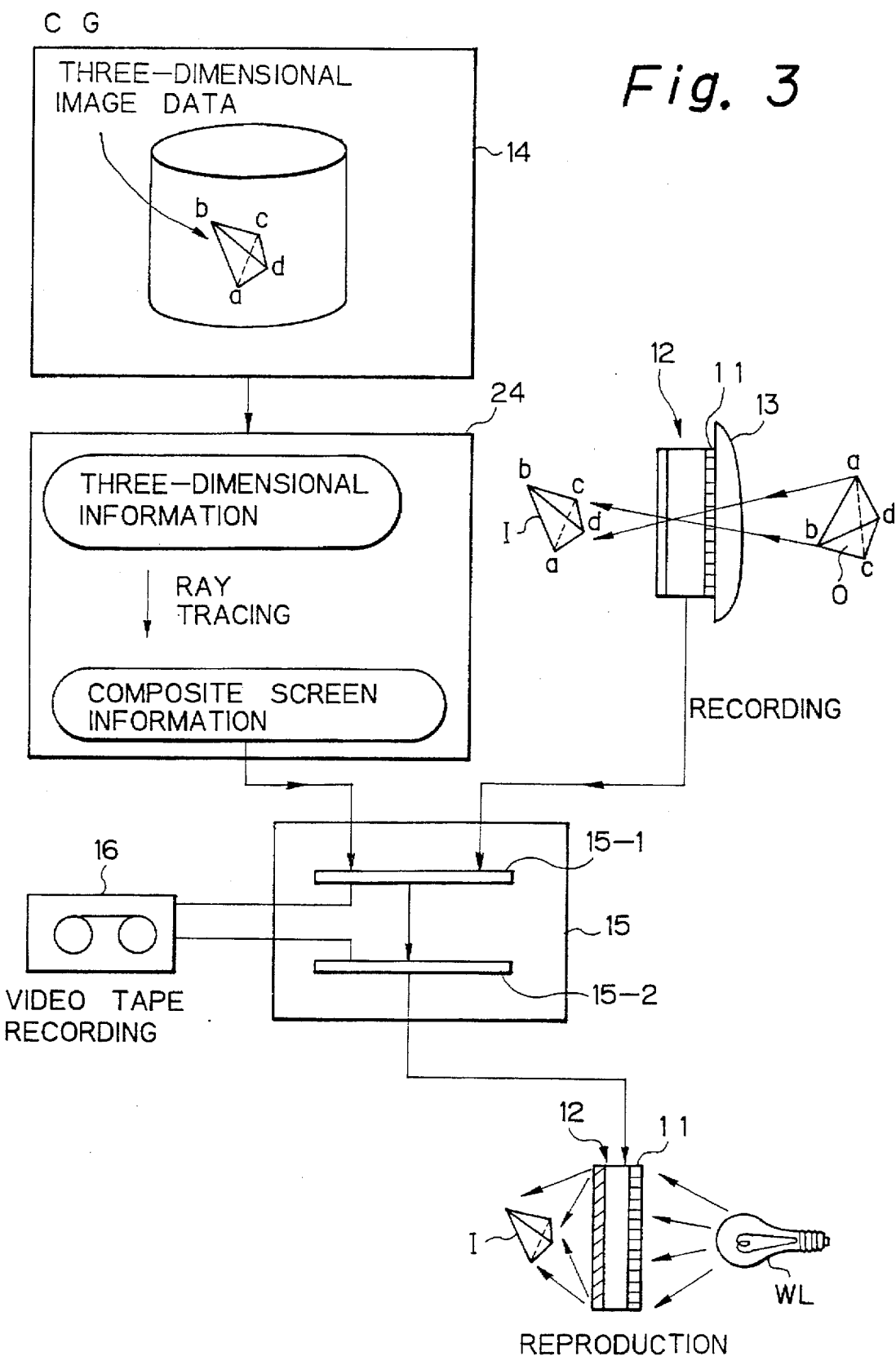

104   PINHOLE PATTERN
      INFORMATION         102

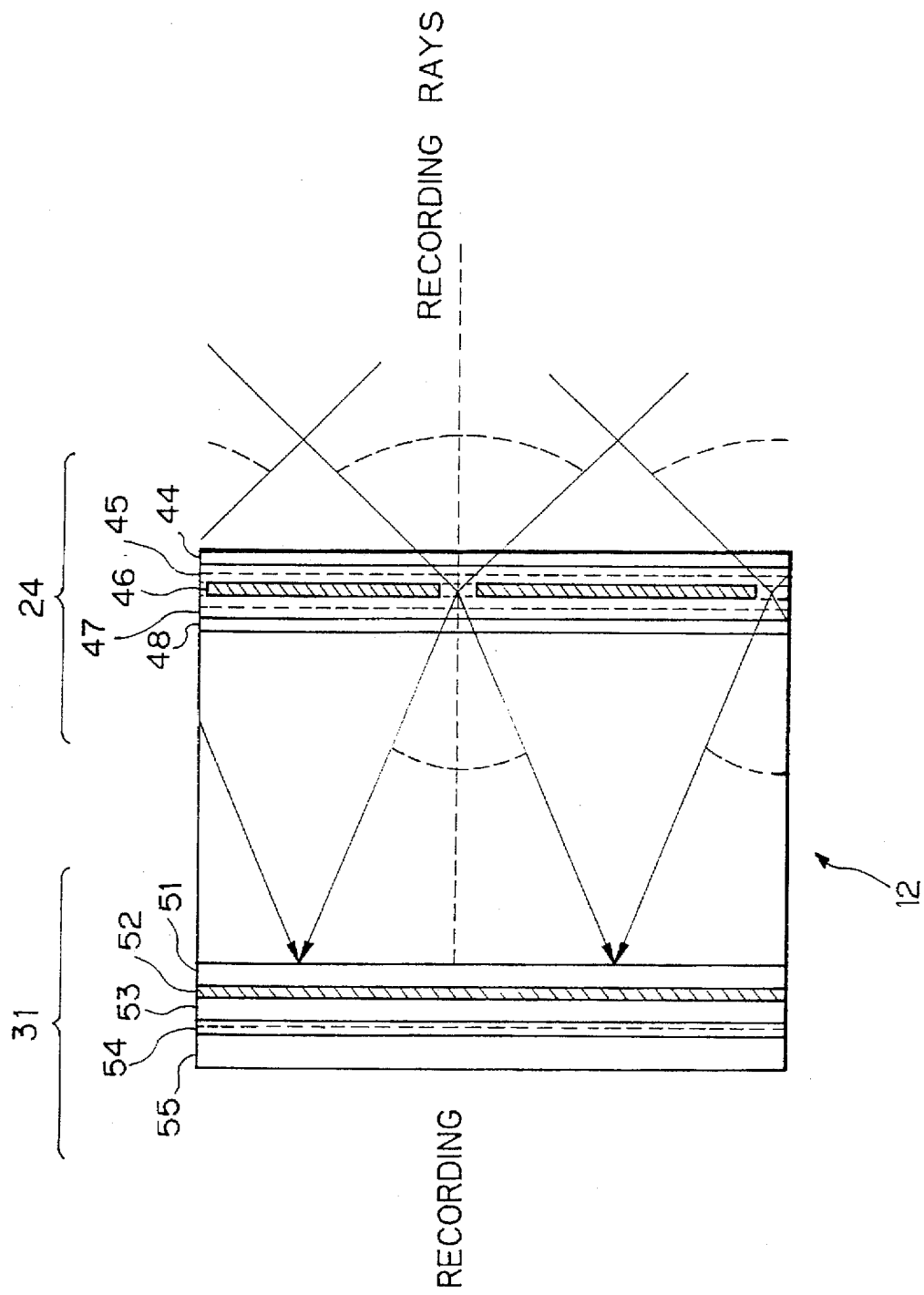

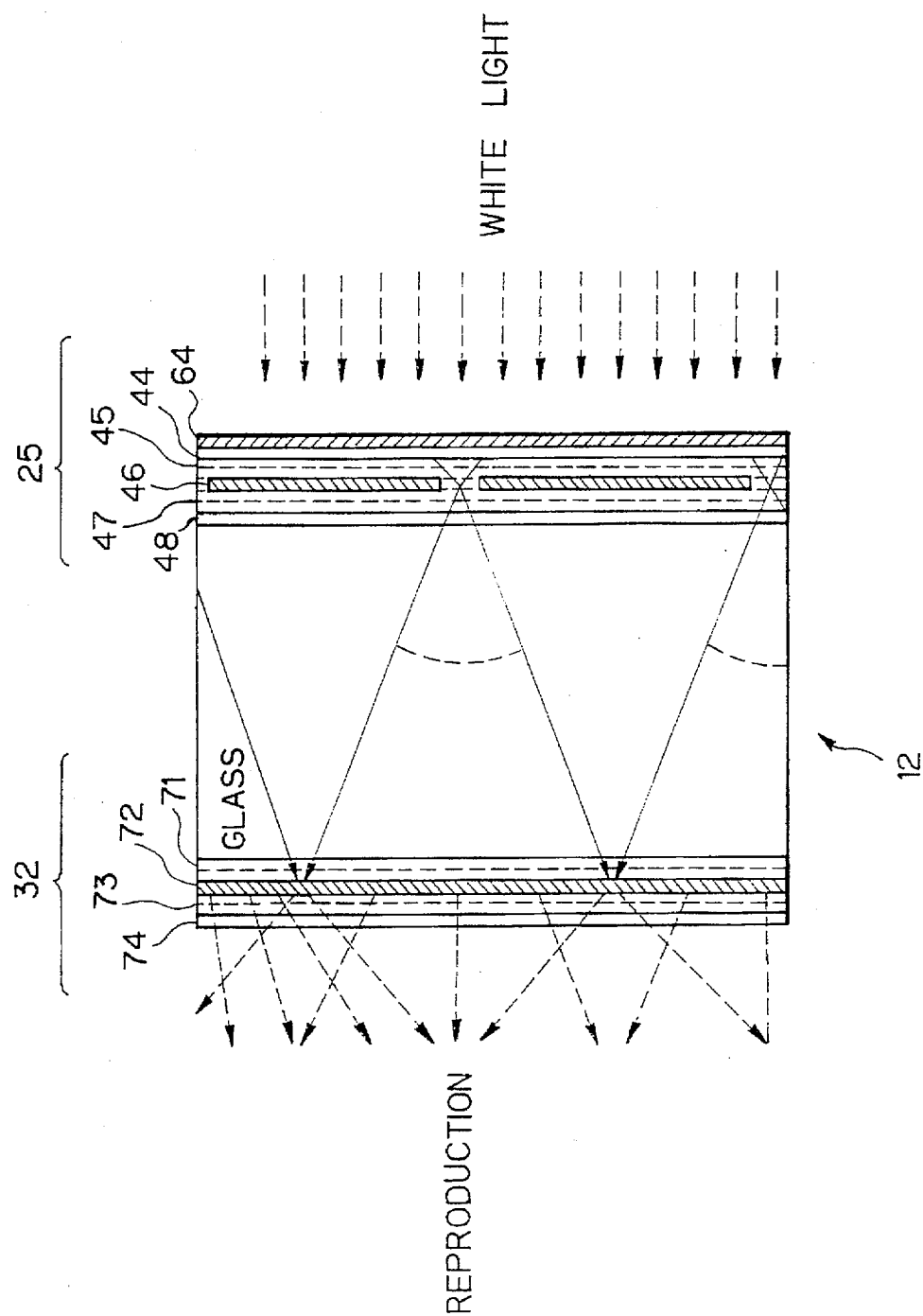

APPARATUS AND METHOD FOR RECORDING AND REPRODUCING THREE-DIMENSIONAL IMAGES

BACKGROUND OF THE INVENTION

1. Field of the Invention

The present invention relates to an apparatus and method for recording and reproducing three-dimensional images.

More specifically, the present invention relates to an apparatus and method for recording three-dimensional images by receiving light originating from an object. Further, the present invention relates to an apparatus and method for reproducing the recorded three-dimensional images by displaying them three-dimensionally. These three-dimensional images can be utilized not only as amusement media, but also as guides for designing three-dimensional structures, three-dimensional molecular construction, etc.

2. Description of the Related Art

A recent art of displaying images has offered various methods for viewing objects directly and showing the objects three-dimensionally. For example, blue and red color filters (anaglyph), polarizing filters, a time-sharing filter using a liquid crystal switch, or a strip-shaped prism filter (lenticular sheet) can be used to show two images, one projected on the right eye and the other on the left eye. A difference in visual angle between the right and left eyes generates a three-dimensional appearance. These methods are employed in movies, televisions, videos, and other display units. As for an art of creating a spatial image and displaying it three-dimensionally, a technology for recording and reproducing three-dimensional images using holography or an integral photography system using a fly's eye lens has been devised.

The three-dimensional images using this integral photography system can be created by expanding a conventional two-dimensional photographic technology. Namely, by combining the two-dimensional photographic technology with the fly's eye lens simulating compound eyes of an insect, true three-dimensional images can be displayed.

Three-dimensional images are not only in demand for amusement media such as televisions, movies, and video games but are also needed from various fields in industry; such as, designing three-dimensional structures, designing three-dimensional molecular structures, and technological training using three-dimensional images. There is an increasing demand for three-dimensional images, which can be viewed from various angles and displayed in color, in order not only to provide a three-dimensional appearance merely as an illusion but also to enable observation of real objects using images that are almost like the real objects.

Conventional three-dimensional images; for example, three-dimensional images based on a difference in visual angle between the right and left eyes, which are the former example described above, are not true three-dimensional images but merely provide a three-dimensional appearance. In the former example, unlike the latter example based on the technology utilizing a hologram or an integral photography system, images are not seen three-dimensionally when viewed from various angles other than the front side, e.g., from the right side or left side, or the top side or bottom side.

On the other hand, the latter example, i.e., a recording system for displaying true three-dimensional images based on a holography, requires a laser beam, since the holography depends on the interference in beames. However, the laser beam is a special coherent beam, and therefore it is necessary for expensive optical apparatus to be provided in order to appropriately generate the laser beam. Moreover, in the above-mentioned recording system, it is difficult for colored images to be reproduced, since interference fringes of holograms change depending on the wavelengths of the light used.

Accordingly, the aforesaid prior art represented by the former and latter examples have the following problems:

(1) A three-dimensional imaging system based on a difference in visual angle between the right and left eyes (former example) has the following problems:

(1-1) In regard to a lenticular imaging system utilizing a lenticular sheet comprised of many columns of convex lenses, as disclosed previously (see, for example, Japanese Unexamined Patent Publications No. 55-129337 and No. 57-161738), the distance from a viewer to a screen is confined by a predetermined condition. On the contrary, in regard to another imaging system utilizing a polarizing filter, the angle of the viewer's eyes with respect to a screen is also confined by a predetermined condition. Therefore, in both systems, viewers cannot view such images in a natural manner.

(1-2) A filter (red and blue, polarizing, time-sharing, etc.) for separating respective images seen by eyes must be worn as glasses. To avoid this, a strip-shaped filter (a lenticular sheet) must be attached immediately in front of a screen or another special device must be installed.

(2) A three-dimensional imaging system based on holography (latter example) has the following problems:

(2-1) In recording computed images, a procedure or process for converting image data into interference fringes and recording these fringes is very complex.

(2-2) A color image is hard to generate, as described above.

(3) An integral photography system (latter example) has the following problems:

(3-1) Since reproduced images are reverse images, the reproduced images must be passed through a fly's eye lens again and then recorded. Such a process is very troublesome.

(3-2) Since images formed by a lens are recorded as photographs, a distance from an object to a lens is fixed depending on a focal length of the lens.

SUMMARY OF THE INVENTION

In view of these problems, an object of the present invention is to provide an apparatus and method for recording and reproducing three-dimensional images, which enables true three-dimensional images to be recorded and reproduced, so that the images can be utilized for guides for designing three-dimensional structures, etc., with a simple construction and low cost.

A further object of the present invention is to provide an apparatus and method for recording and reproducing three-dimensional images in which a special coherent beam such as a laser beam need not be prepared, or in which glasses of special filters need not be worn over both eyes.

A still further object of the present invention is to provide an apparatus and method for recording and reproducing three-dimensional images, in which normal white light can be used as a light source to display color three-dimensional images.

A still further object of the present invention is to provide an apparatus and method for recording and reproducing three-dimensional images, which enables true three-dimensional images to be seen from various angles within the range of a solid angle predetermined by taking into account the whole display screen.

To attain the above objects, the apparatus according to the present invention comprises a non-transmittable or opaque surface having a plurality of transmission points or transparent points at specified spaces, so that light from an object passes through them; a transmittable or transparent body which refracts the light from the transmission points; and a recording surface behind the transmittable body, which records the light from the transmittable body. In this case, the apparatus is operative to record the light which has reached the recording surface as images, and further operative to record the direction of the light in the form of a combination of information about each of the transmission points and the corresponding image.

Further, the apparatus for recording and reproducing three-dimensional images comprises a recording surface which has recorded in advance the first kind of light utilized for recording, originating from an object and passing through the transmittable body, as images. In this case, the apparatus is operative to reproduce the recorded images in the form of the object, by illuminating the recording surface with the second kind of light utilized for reproduction, e.g., white light, via the respective transmission points.

Preferably, the non-transmittable surface is divided into a plurality of blocks, and the plurality of transmission points are allocated to each of the blocks. The apparatus further comprises control means for sequentially selecting one transmission point for each of the blocks and for allowing any kind of light to pass through the selected transmission point.

Further, preferably, a device for converting the quantity of the light which has reached the recording surface into an electric signal, is placed on the recording surface, so that the signal can be recorded.

Further, preferably, another device for converting an electric signal into the quantity of light, is placed on the recording surface, so that the quantity of light can be reproduced.

Further, preferably, the transmittable body has a uniform refractive index, so that the light passing through the transmission points can be transmitted and refracted in the whole circumferential direction.

Further, preferably, the method for recording and reproducing three-dimensional images according to the present invention, can be realized by executing the steps associated with the operation of the above-mentioned apparatus.

In the apparatus and method for recording and reproducing three-dimensional images, light originating from an object is recorded and reproduced by utilizing simple transmission points, i.e., pinholes. Therefore, a special coherent beam such as a laser beam need not be prepared, and glasses of special filters need not be worn over both eyes.

Consequently, the apparatus and method for recording and reproducing color three-dimensional images can be realized with a simple construction and with remarkably low cost of fabrication.

BRIEF DESCRIPTION OF THE DRAWINGS

The above object and features of the present invention will be more apparent from the following description of the preferred embodiments with reference to the accompanying drawings, wherein:

FIGS. 2(A) to 2(C) are constructional diagrams showing an essential embodiment according to the present invention;

FIG. 3 is a block diagram showing one concrete embodiment according to the present invention;

FIGS. 10(A) and 10(B) are side views showing main parts of a recording and reproduction apparatus of another concrete embodiment according to the present invention, respectively.

DESCRIPTION OF THE PREFERRED EMBODIMENTS

Figure 1:
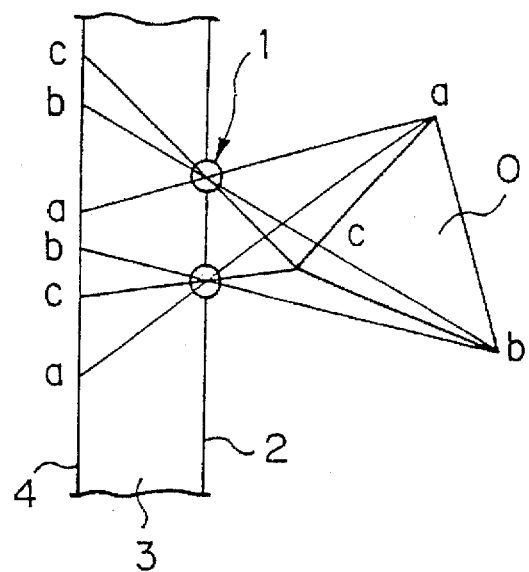
FIG. 1 is a constructional diagram showing the principle of the present invention.

FIG. 1 is a constructional diagram showing the principle of the present invention.

In FIG. 1, transmission points 1 are minute holes that transmit light composed of many rays.

A non-transmittable surface 2 is an opaque surface that has transmission points 1 at regular spaces and does not transmit light. The transmission points 1 are transparent points which transmit light.

A transmittable body 3 made of transparent material refracts light passing through the transmission points 1.

A recording surface 4 is a surface that is placed behind the transmittable body 3 and records light which has passed through the transmittable body 3 via the transmission points 1.

According to the present invention, as shown in FIG. 1, light originating from an object, which has reached the recording surface 4 via the transmission points 1, is recorded as images, and the direction of the light is recorded as a function of the particular transmission point 1 and the corresponding image.

To produce the image, light use for reproduction, illuminates to the recording surface 4 via the transmission points 1.

The non-transmittable surface 2 is divided into multiple blocks. Multiple transmission points 1 are allocated to each of the blocks. One transmission point 1 is selected sequentially for each block. The light originating from an object for recording or white light for reproducing is controlled so as to pass through the selected transmission point 1.

A device for converting the quantity of incident light into an electric signal is placed on the recording surface 4, so that a converted electric signal can be detected and recorded.

A device for converting an electric signal into a quantity of light is placed on the recording surface 4, so that a converted quantity of light can be generated to reproduce images in the form of an object.

The transmittable body 3 is realized with a uniform refractive index, so that the light passing through the transmission points 1 can be transmitted and refracted in the whole circumferential direction.

The transmittable body 3 can also be realized by directing a light path so that the light passing through the transmission points 1 can be transmitted and refracted in the plane direction.

The light composed of the minute portions of rays originating from an object is transmitted through multiple transmission points 1. The produced images are recorded respectively. A three-dimensional color image is reproduced and displayed using white light as a light source, which can be seen three-dimensionally from various angles within the range of a solid angle looking into a regenerative display screen without the necessity of wearing special-filter glasses.

Next, the construction and operation of the preferred embodiments of the present invention will be described sequentially in detail with reference to FIGS. 2(A) to 11.

Figure 2C:
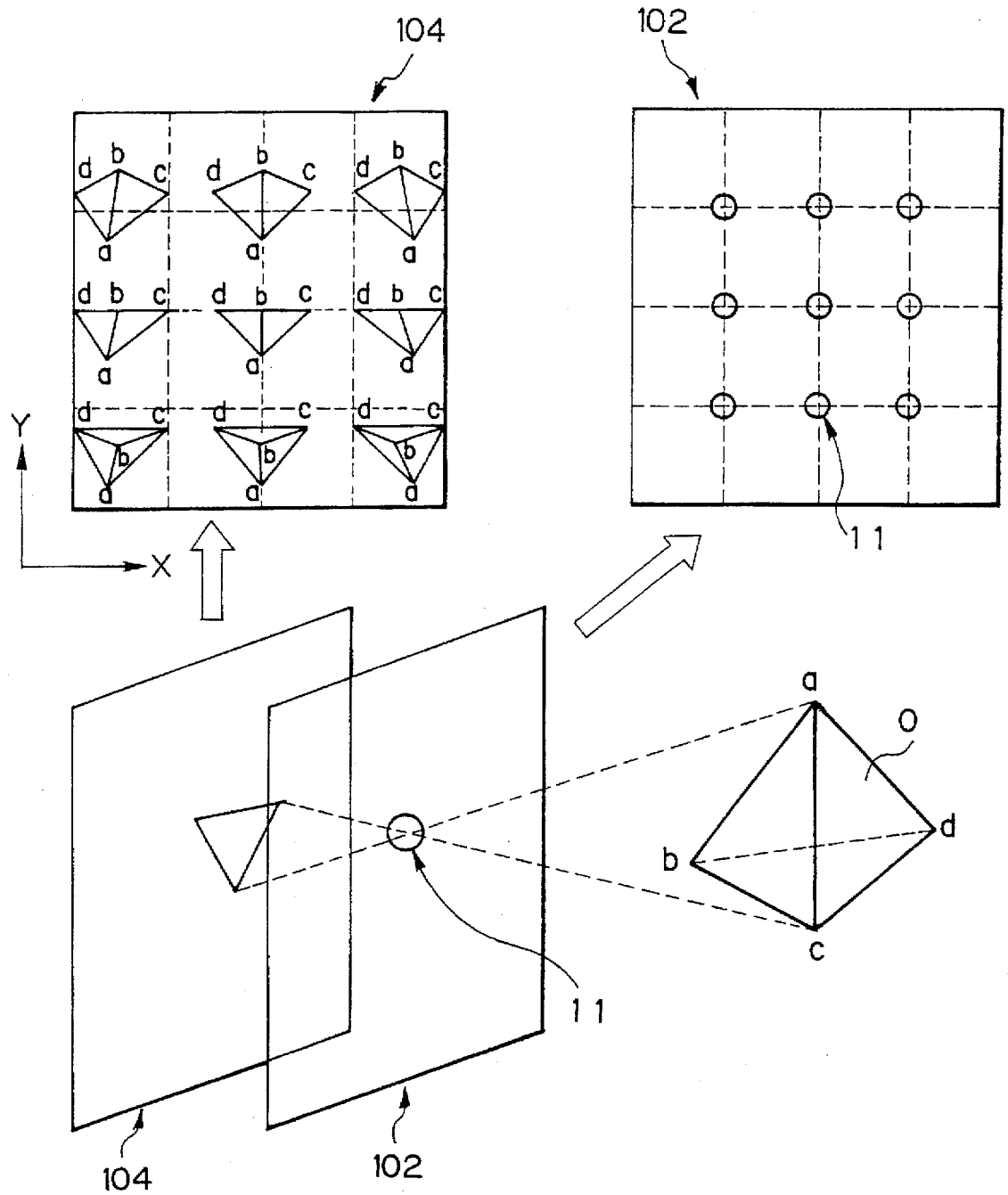

FIGS. 2(A) to 2(C) are constructional diagrams showing an essential embodiment according to the present invention.

FIG. 2(A) is a side view of the whole construction.

In FIG. 2(A), each of incident ports 11 (corresponding to transmission points 1 in FIG. 1) is arranged two-dimensionally in order to transmit a minute portion of rays originating from an object or a minute portion of rays of white light used for reproduction. The incident ports 11 are typically minute pinholes. During recording, recording rays for producing a real or virtual image of the object enter the incident ports 11. The real image is focused at the left side of the recording medium 12, while the virtual image appears at the right side of the recording medium 12. During reproduction, reproduction rays that are natural light or other rays (e.g., white light) enter the incident ports 11.

A recording medium 12 also shown in FIG. 2(B) is a medium for recording images at positions separated by a specified distance from the incident ports 11 or a medium on which images have already been recorded. The surface of the recording medium 12 having the incident ports 11 is referred to as an incident surface 102 (corresponding to a non-transmittable surface 2 in FIG. 1), while the back thereof is referred to as a recording surface 104 (during recording) or a display surface 104' (during reproduction). The portion described as "Bold lines indicate a recording image on the recording surface." in FIG. 2(A) is a recording screen (including the recording image of an object) for recording rays emerging from the incident ports 11. Rays surrounded with bold lines described as "Rays recorded are present within bold lines" in FIG. 2(A) are recorded on the recording screen.

FIG. 2(B) is an exploded view showing a construction of a major portion of a recording medium 12.

Further, (B-1) of FIG. 2(B) is a perspective view of the incident ports 11 in the incident surface 102. Small circles in (B-1) of FIG. 2(B) represent incident ports which are arranged two-dimensionally. The portion of rays emerging from the right side of (B-1) of FIG. 2(B) (rays originating from an object or white light) that falls into the incident ports 11 are transmitted.

(B-2) of FIG. 2(B) is a perspective view of a spacer 101 (corresponding to a transmittable body 3) of the recording medium 12. The spacer 101 is placed to separate the recording surface 104 shown in (B-3) of FIG. 2(B) by a specified distance from the incident ports 11 shown in (B-1) of FIG. 2(B).

(B-3) of FIG. 2(B) is a perspective view of the recording surface 104 of the recording medium 12. On the recording surface 104, light passing through the incident ports 11 shown in (B-1) of FIG. 2(B) is recorded as images shown as hatched circles in (B-3) of FIG. 2(B), or is where recorded images are arranged. During recording, the recording surface 104 records the intensities and colors of conical light passing through the incident ports 11. The recording surface 104 is, for example, a transparent film such as a slide film for directly storing images or a charge-coupled device (hereafter, CCD) for converting the light into electric signals. Electric signals converted are recorded in an external recorder. During reproduction, rays of white light passing through the incident ports 11 reproduce originally recorded images on the recording surface 104 according to the transmittancies of the recorded images. A viewer looks at the recording surface and recognizes the original three-dimensional image. The recording surface 104 is provided with, for example, a transparent film or a transmittable liquid crystal panel. When the transmittable liquid crystal panel is employed, image signals recorded in an external recorder are read to drive the liquid crystal panel, and color images are reproduced to form a three-dimensional image.

FIG. 2(C) is a constructional diagram for explaining in detail a recording process of an essential embodiment of the present invention.

In FIG. 2(C), a tetrahedron having four corners "a", "b", "c" and "d" is selected as an object O for recording on the recording surface 104. Further, it is assumed that nine incident ports 11 are arranged in X-Y directions within the incident surface 102 at equal spaces.

When the light composed of many rays originating from an object O is input to the incident ports 11, the specific rays are selected by the respective incident ports 11. Further, the rays passing through the respective incident ports 11 are recorded in the recording surface 104 as corresponding two-dimensional images.

Each image is slightly different with respect to the recorded image from an adjoining incident ports. For instance, in each of the lower two-dimensional images, a corner "b" is seen near the center of each image. On the contrary, in each of the middle images, a corner "b" is seen in the same position with respect to the Y-direction as the corners "c" and "d". Further, in each of the upper portions of the images, a coordinate of the Y-direction of a corner "b" has a larger value than that of each of the corners "c" and "d". In other words, the respective two-dimensional images include the information concerned with the directions of light from the object O. Therefore, if these two-dimensional images are combined together during reproduction, a true three-dimensional image is regenerated in the form of an object O.

FIG. 3 is a block diagram showing one concrete embodiment according to the present invention. Hereinafter, the same components as those mentioned before will be referred to using the same reference numerals.

In FIG. 3, a recording apparatus by means of the incident ports 11 as described FIG. 2(C) and another recording apparatus by means of computer graphics (referred to as "CG") are simultaneously illustrated. Further, a reproduction apparatus utilizing white light WL is illustrated.

First, a recording apparatus using incident ports 11 will be explained in detail. In this case, an example in which a convex lens 13 is placed in front of the incident ports 11, is illustrated. By virtue of the convex lens 13, it seems that an image I of an object O is coming up to the left side of a recording surface (or display surface) for viewer's eyes. Consequently, the viewer can obtain a more impressive three-dimensconal appearance than the case where the convex lens 13 is not provided.

Alternatively, a concave lens may also be placed in front of the incident ports 11, in place of the above-mentioned convex lens. By virtue of the concave lens, and image of an object having a relatively wide angle can be focused on the recording screen.

During recording, rays originating from an object O pass through a lens 13, and advance leftward to form an image I in FIG. 3. Only the rays passing through incident ports 11 contribute to the formation of the image. After passing through the incident ports 11, the rays transmit conically in the direction of the arrows in FIG. 3 to form the image I in FIG. 3. The recording surface or the back of a recording medium 12 records the rays passing through the incident ports 11 independently. A device such as a CCD, for converting light into electric signals, is placed on the recording surface, and this device converts the image on the recording surface into an electric signal or an image signal. The image signal is recorded in a recorder 16 for video tape recording via a control unit 15. In the above description, an image signal is generated using light originating from an object. Alternatively, computer graphics may be used to calculate an image signal for the recording surface of the recording medium 12. The image signal is then recorded in the recorder 16 via the control unit 15, by changing over a switching device 15-1.

To be more specific about the recording apparatus utilizing computer graphics, it includes a storage device 14 for storing various three-dimensional image data similar to the image I recorded in the recording medium 12. Further, it includes a data processor 24 for selecting necessary three-dimensional image data among the above-mentioned three-dimensional image data. In the data processor 24, by utilizing the technique of ray tracing, two-dimensional images are generated similar to the images shown in FIG. 2(C). Further, composite screen information based on the two-dimensional images is output as the image signal and recorded in the recorder 16 in the same manner as the case of recording by means of the incident ports.

During reproduction, white light WL illuminates the incident ports 11. The light passing through the incident ports 11 illuminates the recording surface (display surface) or the back of the recording medium 12. An image signal read from the recorder 16 is fed to the display surface; for example, to a transmittable liquid crystal panel mounted on the back portion of the recording medium 12 via the control unit 15, whereby an image is reproduced. When an image is reproduced, the transmissible ratio of white light, which illuminates the recording surface (display surface) or the back of the recording medium 12, is varied to restore the same ratio as that for recording. Consequently, an image I is formed as shown in FIG. 3, in the form of the original object.

In this case, by changing over another switching device 15-2, either the images recorded by means of the incident ports or the images recorded by means of the computer graphics can be reproduced.

Figure 4:
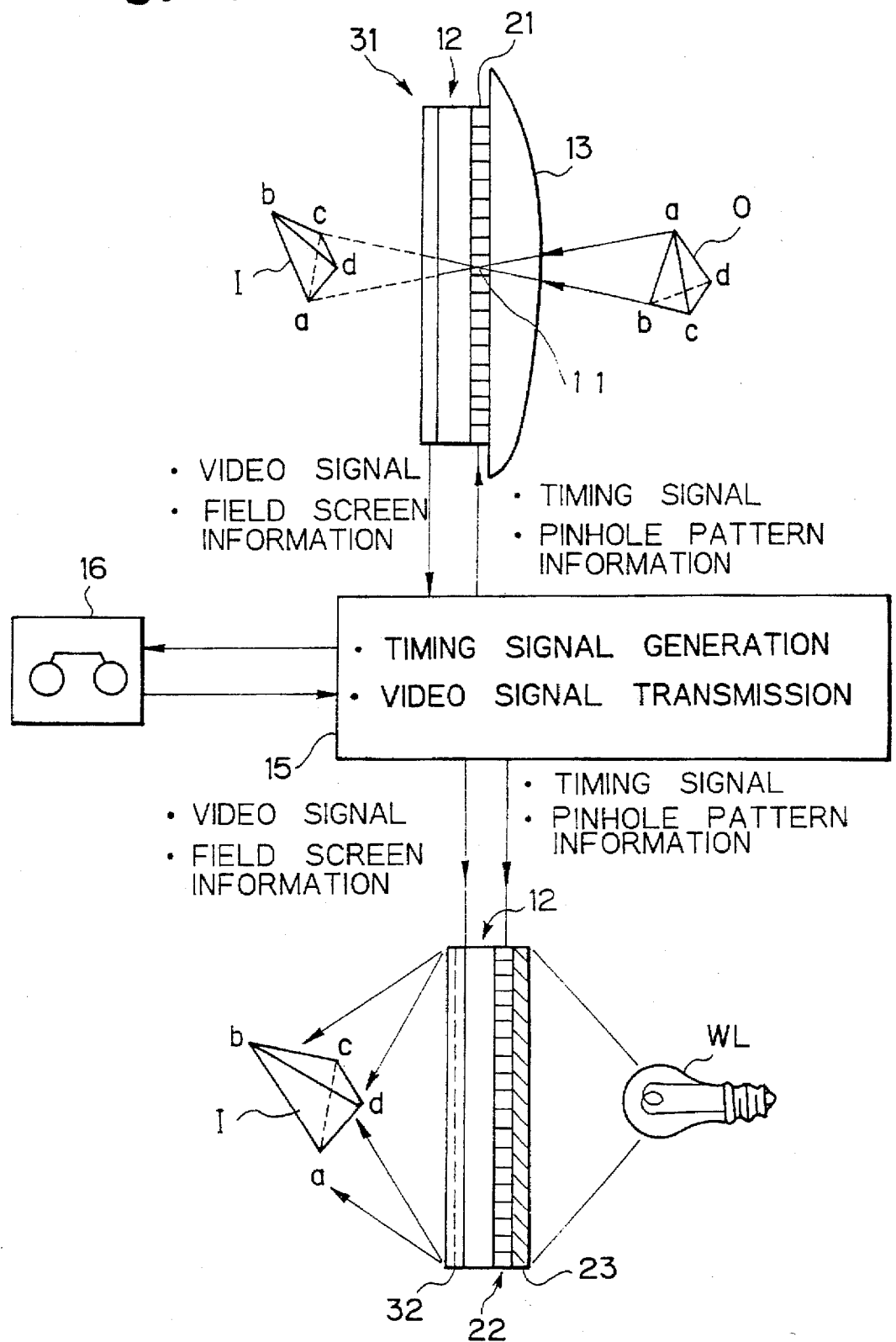
FIG. 4 is a block diagram for explaining in detail a recording and reproduction process for one concrete embodiment shown in FIG. 3.

FIG. 4 is a block diagram for explaining in detail a recording and reproduction process for one concrete embodiment shown in FIG. 3.

FIG. 4 outlines recording and reproduction using a liquid crystal shutter with pinholes serving as incident ports 11.

During recording, rays originating from an object O pass through a lens 13 and illuminate a pinhole liquid crystal shutter 21. After passing through pinholes in the pinhole liquid crystal shutter 21, the rays advance to form a real image I. At this time, a CCD 31 placed on the back portion of a recording medium 12 having a spacer in the middle of the light path converts the image into an electric signal. A control unit 15 sends a timing signal and pinhole pattern information to the pinhole liquid crystal shutter 21, and thus controls which pinhole of each group should be made transmissible. Synchronously with this control, the control unit 15 receives a video (image) signal and field screen information from the CCD 31. The control unit 15 then transmits the video signal to a recorder 16, and generates a timing signal associated with pinhole pattern information so as to report the pinhole pattern to the recorder 16. The recorder 16 records the transmitted video signal and timing signal (pinhole pattern information) in association.

As described above, the rays originating from an object O, which have passed through the pinholes of the pinhole liquid crystal shutter 21, contributes to the formation of an image I. The CCD 31 placed in the middle of the light path converts an image into a video (image) signal. The video signal is recorded in the recorder 16 in association with the pinhole pattern information and the field screen information, whereby it becomes possible to record three-dimensional information of an object O.

During reproduction, white light WL illuminates the pinhole liquid crystal shutter 22 via a diffusing plate 23. The rays passing through pinholes in the pinhole liquid crystal shutter 22 advance toward a liquid crystal panel 32. In the meantime, the control unit 15 reads a video signal and a timing signal (pinhole pattern information) from the recorder 16. The control unit 15 extends control so that the pinhole of the pinhole liquid crystal shutter 22 conforming to the pinhole pattern information and the field screen information becomes transparent, and supplies the video signal to the liquid crystal panel 32. The transmissibility of white light illuminating the liquid crystal panel 32 is thus controlled so as to restore an original image or the state at the time of recording. When the restoration of an original imaging state is achieved, an image I is formed as shown in FIG. 4.

As described above, the portion of white light WL passing through the pinholes of the pinhole liquid crystal shutter 22, which pinholes are controlled to be transmittable, illuminates to the liquid crystal panel 32. The liquid crystal panel 32 is driven with a regenerated video signal, an original image or the state at the time of recording is restored, and then an image is formed as shown in FIG. 4. Thus, a three-dimensional image of an original object can be reproduced using the recorded video signals and timing signals (pinhole pattern information).

Figure 5:
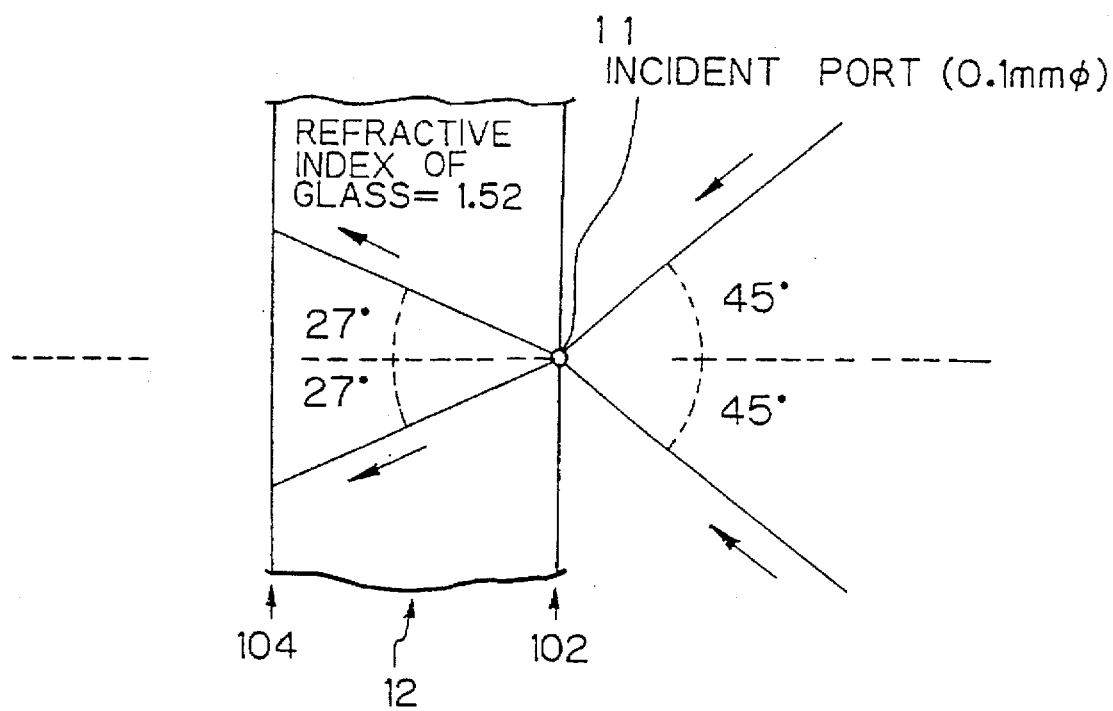
FIG. 5 is an enlarged side view showing an incident port of one concrete embodiment according to the present invention.

FIG. 5 is an explanatory diagram of an incident port of one concrete embodiment according to the present invention, which shows the relationship between the size of an image associated with an incident port (pinhole) and the refractive index.

In FIG. 5, the refractive index of a glass constituting a recording medium 12 is 1.52 and the distance is 10 mm. In this structure, when rays illuminate an incident port (pinhole of 0.1 mm in diameter) 11, at an incident surface 102 at 45° from the right side in FIG. 5, the rays are refracted at about 27°. On the recording surface 104 or the back of the recording medium 12 at a distance of 10 mm, the rays have a diameter of 5 mm. This means that the incident port 11 must be formed at least 5 mm away from another one. Otherwise, an image formed by one incident port 11 will overlap an image formed by another adjacent incident port 11. This may disable reproduction of a three-dimensional image. To avoid this disadvantage, in this example, the incident port 11 is arranged 5 mm away from another one. This reduces the resolution of the system. Multiple (for example, 60) incident ports are, as described later, grouped within a rectangular block of 5 mm by 5 mm. The incident ports belonging to a group are time-shared and changed sequentially, so that only one of the incident ports can be made transmissible. This contributes to improved resolution (and will be described later in conjunction with FIGS. 7(A) to 7(C)).

Figure 6A:
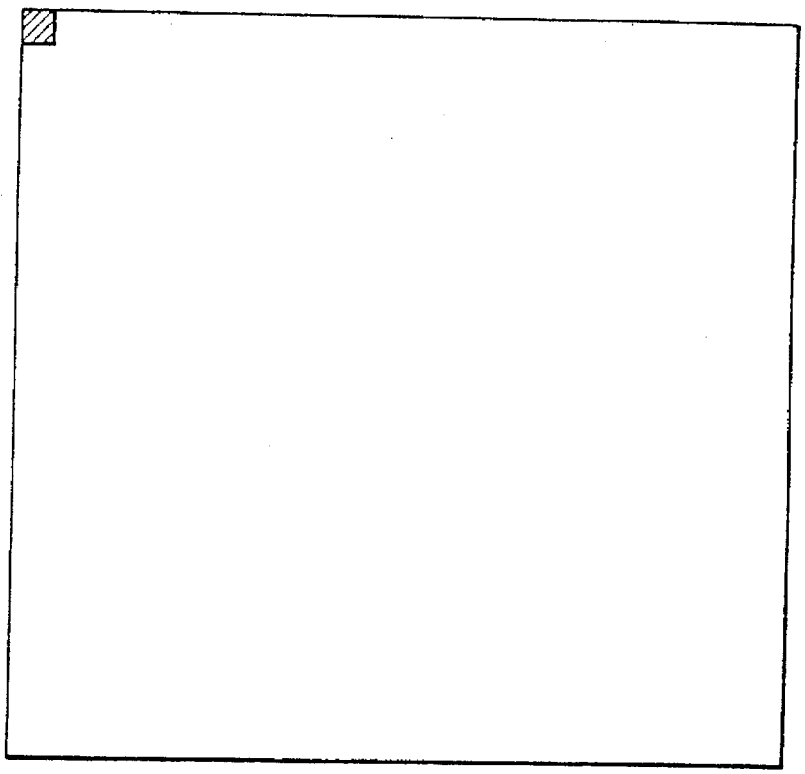
FIGS. 6(A) to 6(C) are schematic diagrams showing another concrete embodiment according to the present invention.
Figure 6B:
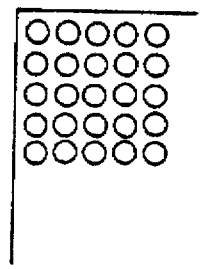
Figure 6C:
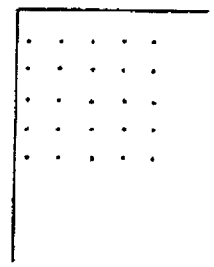

FIGS. 6(A) to 6(C) are schematic diagrams showing another concrete embodiment according to the present invention.

FIG. 6(A) shows an overall construction. In FIG. 6(A), images from multiple incident ports, which are formed at spaces of 5 mm on a recording surface and a display surface, are provided within a block of 500 by 500 mm. FIGS. 6(B) and 6(C) are enlarged images of an area of 25 by 25 mm.

FIG. 6(B) shows an example of images on the recording or display surface. As described in conjunction with FIG. 5, images are formed at spaces of 5 mm on the recording or display surface as indicated with white circles in FIG. 6(B) so as not to overlap images produced by adjacent incident ports 11.

FIG. 6(C) shows an example of a liquid crystal shutter pattern. As described in conjunction with FIG. 5, pinhole patterns are formed at spaces of 5 mm apart so that images of produced by adjacent incident ports 11 will not overlap on the recording or display surface.

Figure 7A:
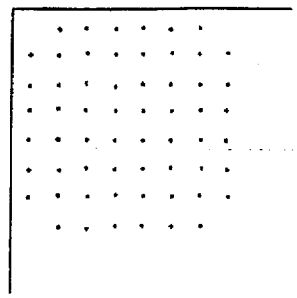
FIGS. 7(A) and 7(B) are enlarged front views showing incident ports of another concrete embodiment according to the present invention.
Figure 7B:
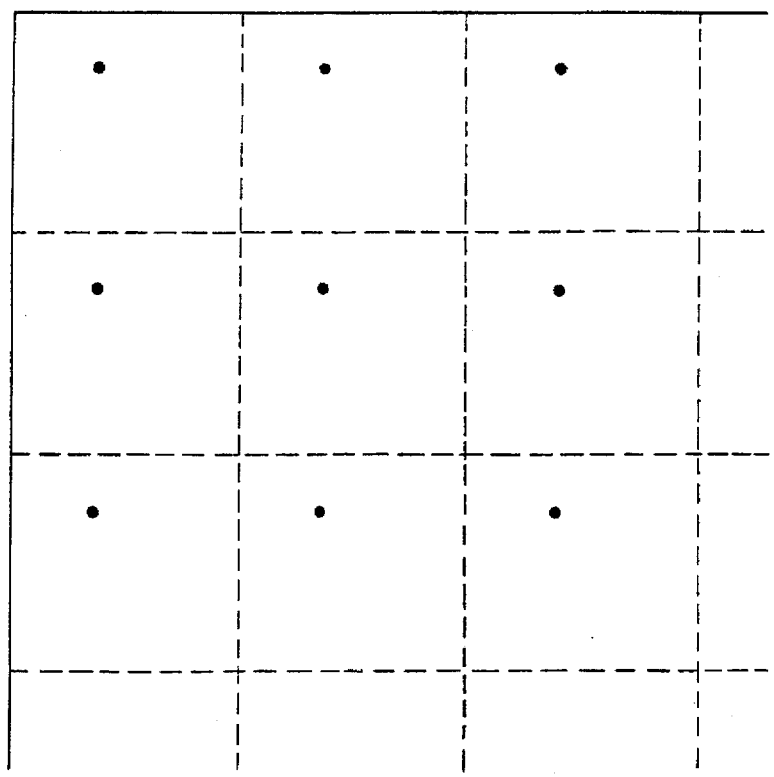

FIGS. 7(A) and 7(B) are enlarged front views showing incident ports of another concrete embodiment according to the present invention. In the embodiment, incident ports i.e., pinhole patterns are opened sequentially in time-sharing, so that an effective resolution of image can become high.

FIG. 7(A) shows an example of a pinhole liquid crystal shutter. There are 60 pinholes grouped within a range of 5 by 5 mm. It is repeated that any one of the pinholes can be made transmissible and that this improves the overall resolution.

FIG. 7(B) shows a state in which one of the pinholes belonging to a group is made transmissible across multiple pinhole groups. The pinhole in the group that will become transmissible is changed sequentially. This results in improved resolution.

Figure 7C:
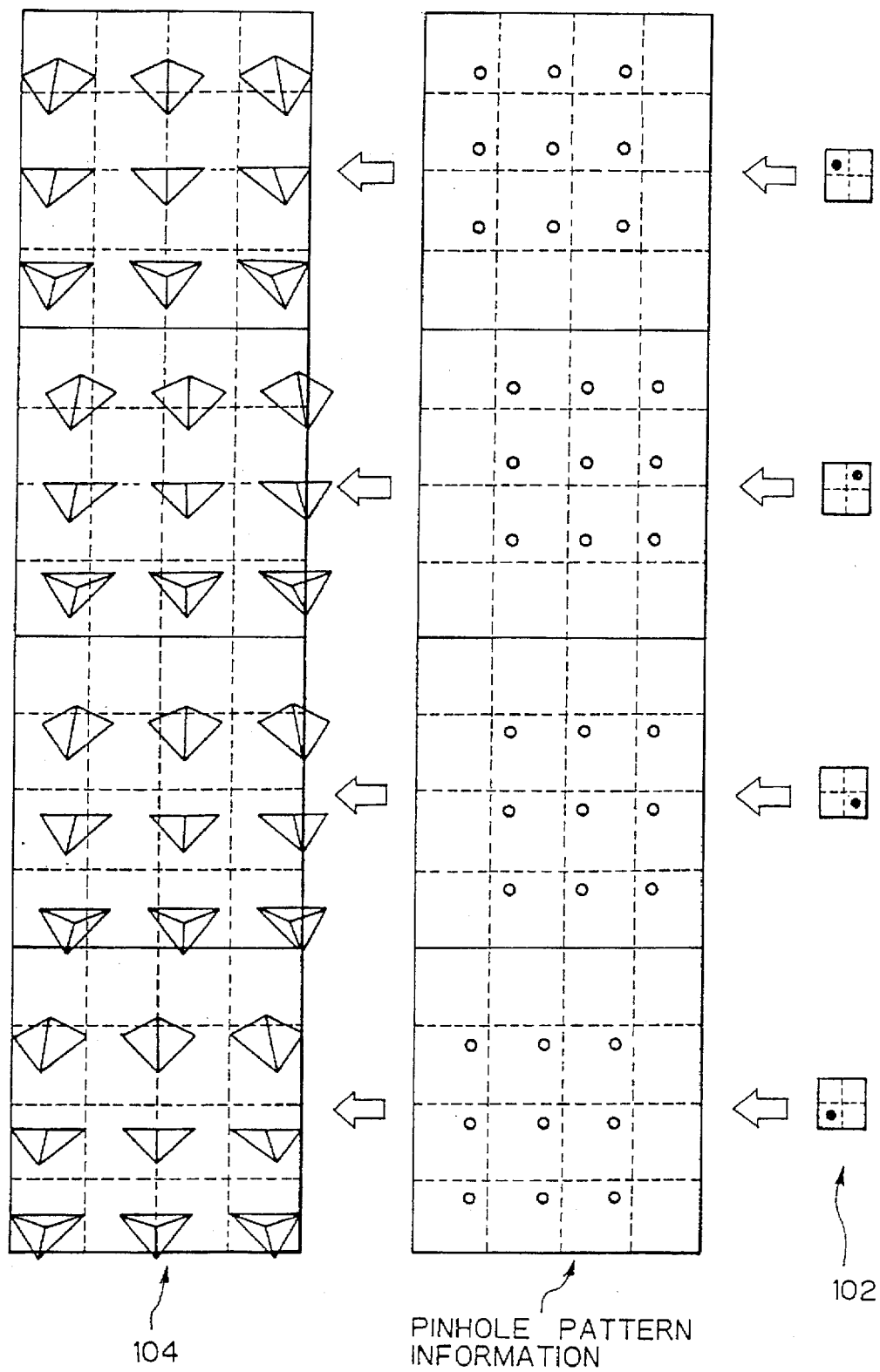
FIG. 7(C) is an enlarged front view for explaining in detail a recording and reproduction process for another concrete embodiment according to the present invention.

FIG. 7(C) is an enlarged front view for explaining in detail a recording and reproduction process for another concrete embodiment according to the present invention.

In FIG. 7(C), the right portion represents the state where a portion of incident surface 102 for recording is moved clockwise, in four groups. Further, the middle portion represents the pinhole pattern information of each group, indicating the positions where light can be transmitted (white circles). Furthermore, the left portion represents two-dimensional images recorded on recording surfaces 104, respectively corresponding to the pinholes used.

The recorded tetrahedral images are slightly different with respect to adjoining pinholes within each group, and further, the images are gradually changed between different groups by moving the positions of pinholes in time-sharing. As the number of pinholes in a given area and the speed of moving the pinholes are increased, a higher resolution of three-dimensional image can be realized.

Next, the operation of changing the pinhole pattern which can be made transmissible from pinhole pattern number $p=1$ to $p=60$ in the structure of FIG. 7(A) will be described according to the sequence of the flowcharts shown in FIGS. 8(A) and 8(B). An example of creating a static image will be described.

Figure 8A:
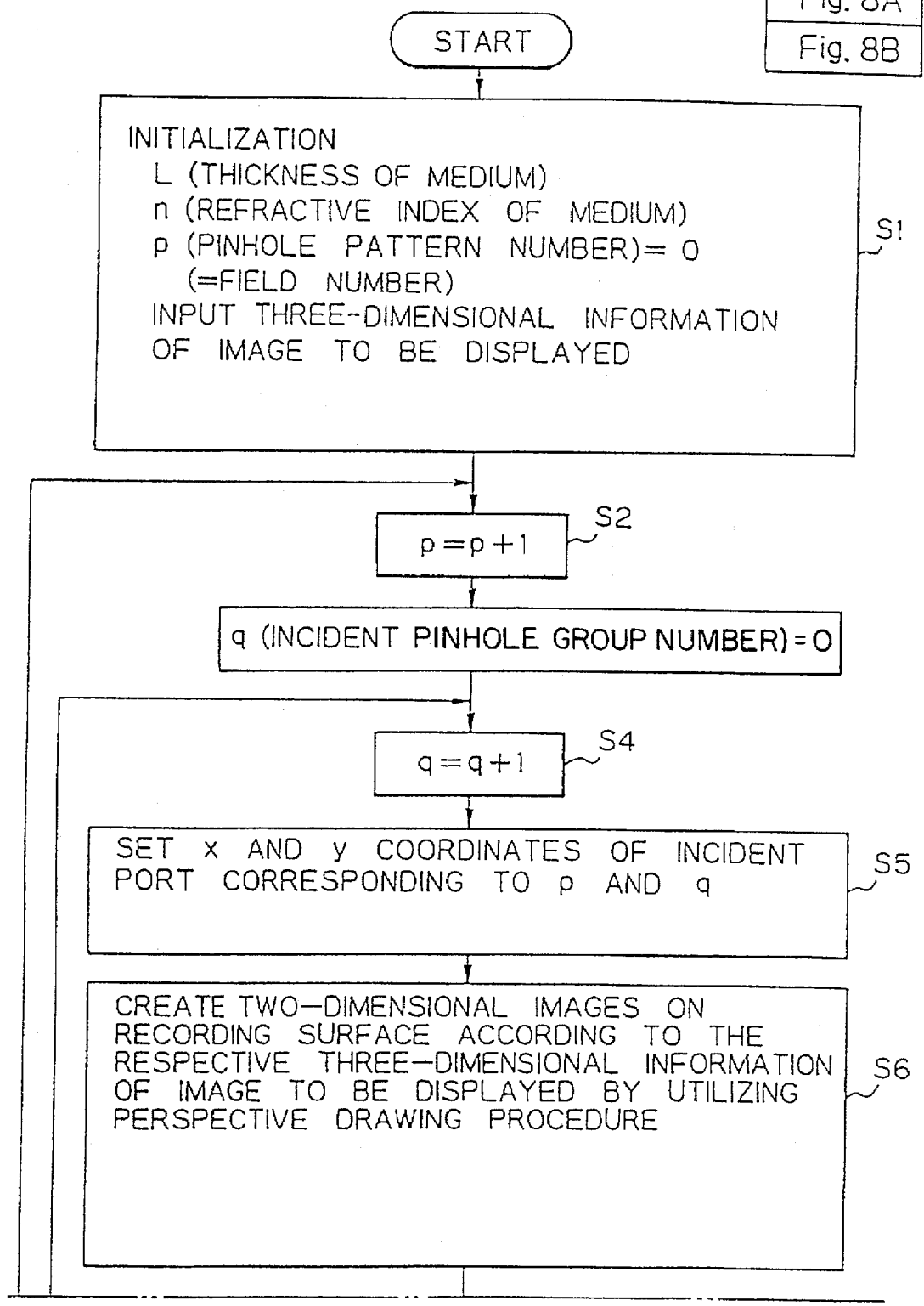
FIGS. 8(A) and 8(B) are flowcharts for explaining the operation of another concrete embodiment according to the present invention.
Figure 8B:
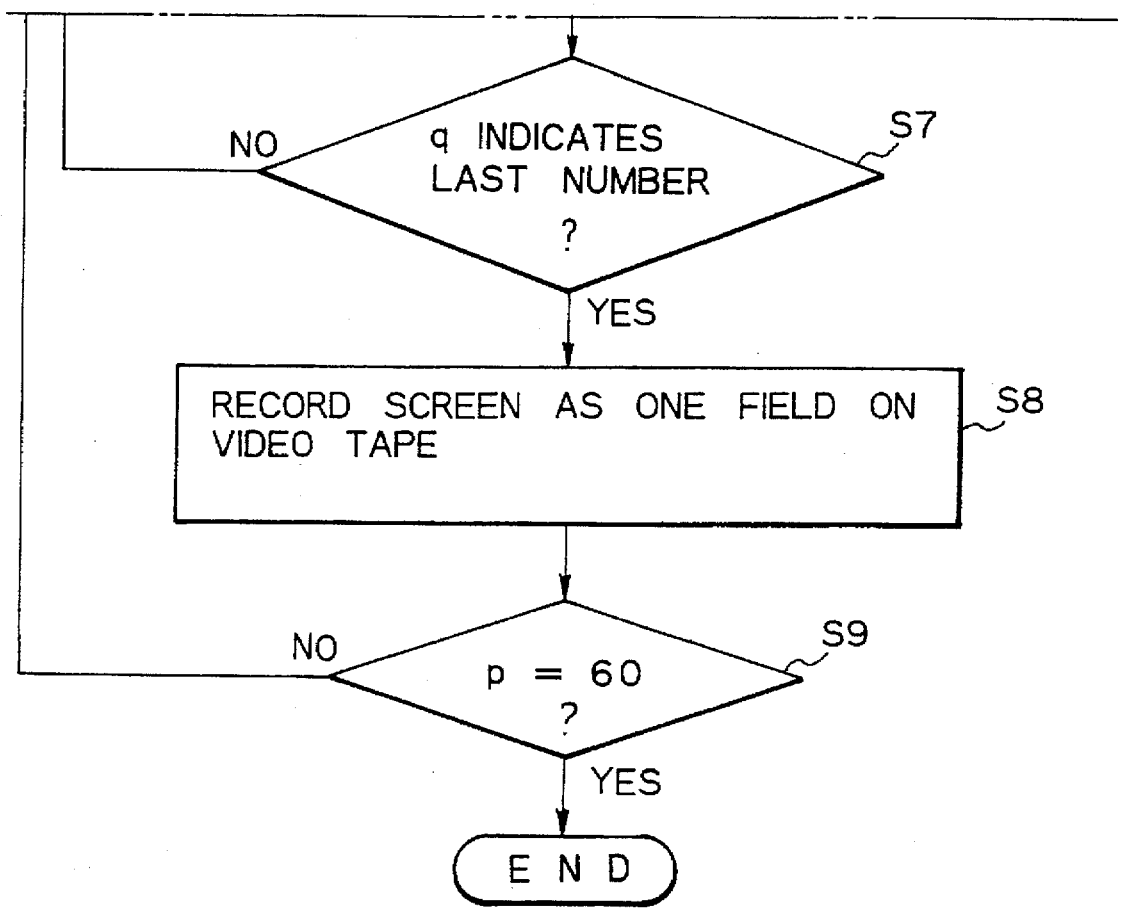

Here, the operation of changing the pinhole pattern should be illustrated in one drawing of FIG. 8. However, in this case, since it is difficult for FIG. 8 to be contained in one sheet, FIG. 8 is divided into two drawings of FIGS. 8(A) and 8(B).

In FIG. 8(A), S1 represents an initialization step, wherein:

L: thickness of a medium (for example, 10 mm as the thickness of the recording medium 12 in FIG. 5);

n: refractive index of a medium (for example, 1.52 as the refractive index of the recording medium 12 in FIG. 5);

p: pinhole pattern number (0 is set as an initial value. The pinhole pattern number corresponds to a field number of an image signal.)

"Input three-dimensional information of an image to be displayed" means that three-dimensional information of, for example, a static image to be recorded should be inputted.

At S2, $p=p+1$ is executed. Specifically, the pinhole pattern number p is incremented by 1 and thus updated to be a next pinhole pattern number.

At S3, q (incident pinhole group) is initialized to be 0.

At S4, $q=q+1$ is executed. Specifically, the incident pinhole group q is incremented by 1 and thus updated.

At S5, the x and y coordinates of an incident port corresponding to the p and q values are determined.

At S6, two-dimensional images are created on a recording surface according to three-dimensional information of an image to be displayed using a perspective drawing procedure (e.g., ray tracing). Specifically, the computer graphics described in FIG. 3 creates two-dimensional images on the recording surface.

At S7 in FIG. 8(B), it is determined whether or not q indicates the last pinhole group number on the incident surface. If q indicates the last number, control passes to S8. If q is not the last number, control returns to S4. Then, q is incremented by 1. The above sequence is repeated for the next incident port number.

At S8 in FIG. 8(B), a screen is recorded as one field on video tape.

According to the above sequence, when one pinhole pattern number p within each group is made transmissible, two-dimensional images corresponding to all incident pinhole group numbers q are created sequentially on the recording surface. The two-dimensional images are then recorded as the images on the recording surface for one field.

Next, it is determined whether or not p equals 60 at S9 in FIG. 8(B). If p equals 60, the pinhole pattern has been changed from $p=1$ to $p=60$. Consequently, two-dimensional images for 60 fields have been recorded from the recording surface onto video tape. The process of creating one static image is then terminated. When an animated image is to be created, the sequence from S1 to S9 is further repeated for three-dimensional information of a new image. Pinhole patterns belonging to the same group are changed sequentially from $P=1$ to $P=60$ and two-dimensional images created the recording surface are recorded on video tape.

Figure 9:
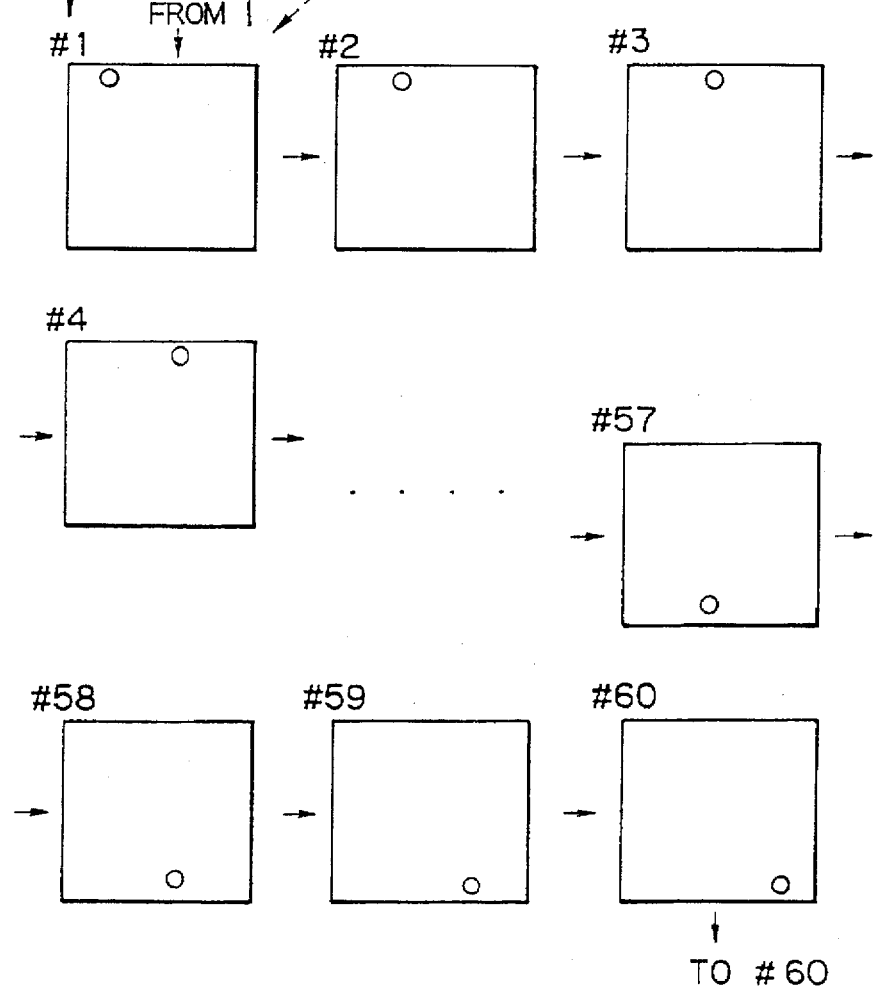
FIG. 9 is a schematic diagram for explaining the operation of incident ports of another concrete embodiment according to the present invention.

FIG. 9 is an explanatory diagram of the operation of incident ports of another concrete embodiment according to the present invention. In FIG. 9, the pinhole pattern is changed sequentially from p=1 to p=60 according to the flowcharts of FIGS. 8(A) and 8(B).

The upper portion of FIG. 9 shows 60 pinholes within a block of 5 by 5 mm in FIG. 7(A). 1 to 60 are pinhole pattern numbers.

The lower portion of FIG. 9 shows an example of changing pinhole pattern numbers. The numerals each written on the upper left of a square; that is, 1, 2, 3, etc., 60 are pinhole pattern numbers. The pinhole pattern number gets larger sequentially. The pinhole pattern numbers in FIG. 9 belong to one group. In the other groups, the same selected pinhole pattern numbers is made transmissible sequentially, similar to the sequence described above.

FIGS. 10(A) and 10(B) are side views showing main parts of a recording and reproduction process for another concrete embodiment according to the present invention.

FIG. 10(A) shows a structure of a recording medium 12 for recording. In FIG. 10(A), a liquid crystal shutter 24 serving as incident ports 11 is mounted on the front portion of the recording medium 12. A CCD 31 is mounted on the back portion of the recording medium 12.

The liquid crystal shutter 24 comprises, as shown in FIG. 10(A):

a polarizing plate protected with a transparent glass 44;

a transparent electrode 45;

a liquid crystal plate 46;

a transparent electrode 47; and a polarizing plate 48 in that order from the incident end. The liquid crystal plate 46 is segmented as shown in FIG. 10(A). Any one of liquid crystals in each group is made transmissible as described in conjunction with FIG. 9. Transmittancy control is achieved by applying voltage to a space between the transparent electrodes 45, 47 and controlling the rotation angle of the plane of polarization of rays passing through the space.

The CCD 31 on the back portion comprises, as shown in FIG. 10(A):

a light receiver 51;

a gate 52;

a transferring section 53;

an electrode 54; and a glass 55 in that order from the incident end.
The light receiver converts an image, which has passed through the glass constituting a spacer of the recording medium 12, for example, a tetrahedral image shown in FIG. 2(C) into an electric signal.

FIG. 10(B) shows a structure of the recording medium used for reproduction. In FIG. 10(B), a liquid crystal shutter 25 identical to the liquid crystal shutter 24 shown in FIG. 10(A) is mounted on the front portion of the recording medium 12, which serves as incident ports 11. A liquid crystal panel 32 is mounted on the back portion of the recording medium 12. The liquid crystal shutter 24 in FIG. 10(A) inputs recording rays from an object, while a liquid crystal shutter 25 in FIG. 10(B) inputs white light for reproduction via a diffusing plate 64. The components other than plate 64 are identical to those of FIG. 10(A). Therefore, the description thereof will be omitted.

The liquid crystal panel 32 on the back portion of the recording medium 12 comprises, as shown in FIG. 10(B):

a transparent glass within the spacer of the recording medium 12;

a transparent electrode 71;

a liquid crystal plate 72;

a transparent electrode 73; and a polarizing plate 74 in that order from the incident end. The liquid crystal plate 72 changes the amount of light transmitted according to an image signal reproduced from a recorder 16 shown in FIG. 3. After passing through the liquid crystal plate 72 and polarizing plate 74, rays are restored to original states or states at the time of recording. Consequently, a three-dimensional image can be formed.

Figure 11:
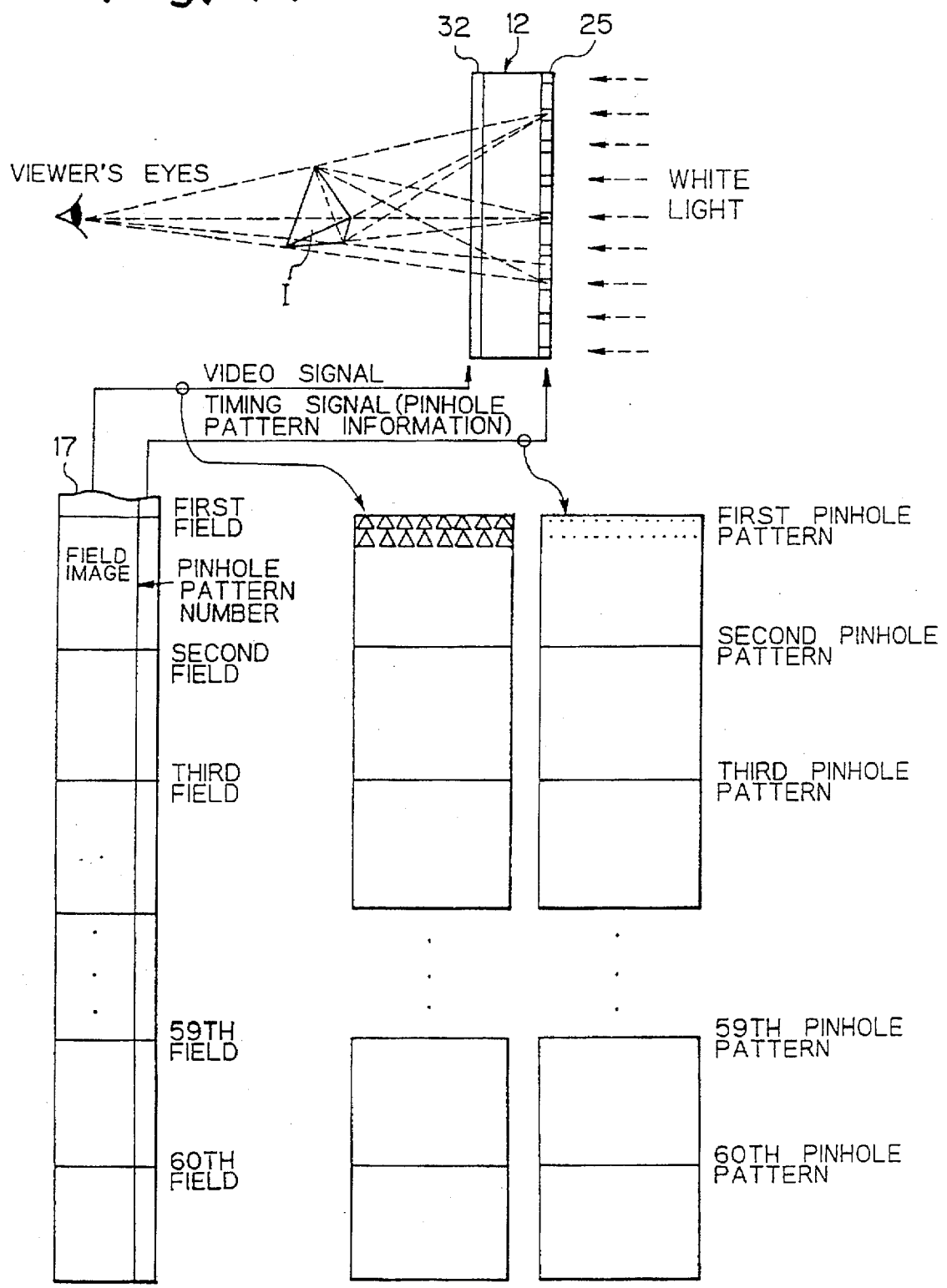
FIG. 11 is a schematic diagram for explaining the reproduction process in FIG. 10(B).

FIG. 11 is a schematic diagram for explaining the reproduction process in FIG. 10(B).

In FIG. 11, video signals sent from the CCD 31 shown in FIG. 4, and together with timing signals (pinhole pattern numbers), are recorded on video tape 17. During reproduction, the video signals and timing signals are read from the video tape 17. With a video signal, a liquid crystal panel 32 is driven and the transmissibility of the white light is controlled. With a timing signal (pinhole pattern number), a liquid crystal shutter 25 is driven, the transmissibility of a pinhole pattern having the pinhole pattern number represented by the timing signal is controlled for each group as described previously, and the white light entering from the right side in FIG. 11 is transmitted to illuminate the liquid crystal panel 32 and to produce an image I of an object.

In the example of the operation of a liquid crystal shutter shown in the lower portion of FIG. 11, one group composed of 60 pinholes is described in conjunction with FIG. 9. Synchronously with timing signals (pinhole pattern numbers) read from the video tape 17, the first pinhole pattern, second pinhole pattern, etc., are made transparent sequentially one at a time for each group of the liquid crystal shutter 25.

In the example of the operation of a liquid crystal shutter shown in the lower portion of FIG. 11, with video signals read from the video tape 17, the first field, second field, etc. of the liquid crystal panel 32 are made transparent. Images are then reproduced exactly like the ones at the time of recording. When the reproduced images are viewed by a viewer, a three-dimensional image is visible in the form of the original object.

In the aforesaid embodiments, as shown in FIGS. 2 to 11, glass material having a uniform refractive index is employed as a transmittable or transparent body. Alternatively, polarizing materials may be laminated in a multiplied form, whereby light passing through a pinhole can be transmitted and retracted like a sector in a plane direction. In this case, images are brighter than those recorded using conically-retracted light having a uniform refractive index.

In this case, pinholes on a screen can be arranged with a higher density. Therefore, when pinholes in a block are made transparent sequentially, even if the number of driven pinholes per unit time is reduced, effective brightness can be maintained.

As described so far, according to the preferred embodiments of the present invention, light originating from an object, which has reached a recording surface via transmission points or transparent points, is recorded as images, and the direction of the light is recorded in association with the combination of information about each transmission point and the corresponding image. The recording surface is illuminated via the transmission points in order to reproduce images. This construction enables simple recording of a three-dimensional image of an object and reproduction of a color three-dimensional image using white light as a light source. In particular, when a color three-dimensional image is reproduced, special-filter glasses need not be worn unlike a prior art. Further, the image can be seen three-dimensionally from various angles within the range of solid angle looking into a display screen, e.g., liquid crystal panel.

While the present invention has been described as related to the preferred embodiments, it will be understood that various changes and modifications may be made without departing from the spirit and the scope of the invention as hereinafter claimed.

I claim:

1. An apparatus for recording a three-dimensional image of an object illuminated with light, comprising:

a non-transmittable surface divided into a plurality of blocks, each of the blocks having a plurality of transmission points at specified spaces;

a control device to control a passage of the light originating from the object through said transmission points by sequentially selecting at least one of said transmission points of each of said blocks;

a transmittable body to refract the light passing through said transmission points; and a recording surface, placed behind said transmittable body, to record the three-dimensional image represented by the light passing through said transmittable body via said transmission points.

2. An apparatus as set forth in claim 1, further comprising a device, disposed on said recording surface, to convert a quantity of the light reaching said recording surface into an electric signal and to record the electric signals representing the three-dimensional image.

3. An apparatus as set forth in claim 1, wherein said transmittable body has a uniform refractive index to transmit and refract the light passing through said transmission points in the whole circumferential direction.

4. An apparatus as set forth in claim 1, wherein said transmittable body has a specified directive property for a light path to transmit and refract the light passing through said transmission points in a plane direction.

5. An apparatus for recording a three-dimensional image of an object illuminated with a first light and reproducing the three-dimensional images using a second light, comprising:

a non-transmittable surface divided into a plurality of blocks, each of the blocks having a plurality of transmission points at specified spaces;

a control device to control a passage of the first and second lights through said transmission points by sequentially selecting at least one of said transmission points of each of said blocks with timing signal and transmission point pattern information;

a transmittable body to refract the first and second lights passing through said transmission points; and a recording surface, placed behind said transmittable body, to record, in advance, the three-dimensional image represented by the first light originating from the object and passing through said transmittable body via said transmission points, and to reproduce the three-dimensional image recorded in advance when said recording surface is illuminated with the second light directed through said transmission points by said control device using the timing signal and transmission point pattern information.

6. An apparatus as set forth in claim 2, further comprising a device, disposed on said recording surface, to convert a quantity of the first light reaching said recording surface into electric signals, to record, in advance, the electric signals representing the three-dimensional image, and to reproduce the three-dimensional image using the electric signals recorded in advance.

7. An apparatus as set forth in claim 5, wherein said transmittable body has a uniform refractive index to transmit and refract the first and second lights passing through said transmission points in the whole circumferential direction.

8. An apparatus as set forth in claim 5, wherein said transmittable body has a specified directive property for a light path to transmit and refract the first and second lights passing through said transmission points in a plane direction.

9. A method for recording a three-dimensional image of an object, including the steps of:

dividing a non-transmittable surface into a plurality of blocks, each of the blocks having a plurality of transmission points;

directing light originating from the object through the plurality of transmission points by sequentially selecting at least one of the transmission points for each of the blocks;

refracting the light passing through the transmission points by; and recording the three-dimensional image represented by the light directed through the transmission points by said step of directing and refracted by said step of refracting.

10. A method as set forth in claim 9, wherein said step of recording comprises the step of converting a quantity of the light, directed through the transmission points by said step of directing and refracted by said step of refracting, into electric signals, representing the three-dimensional image, which are recorded.

11. A method for recording and reproducing a three-dimensional image of an object, including the steps of:

dividing a non-transmittable surface into a plurality of blocks, each of the blocks having a plurality of transmission points;

directing first and second lights through the plurality of transmission points by sequentially selecting at least one of the transmission points for each of the blocks;

refracting the first and second lights through the transmission points;

recording on a recording surface, in advance, the three-dimensional image represented by the first light originating from the object directed through the transmission points by said step of directing and refracted by said step of refracting; and reproducing the three-dimensional images recorded in advance by said step of recording by illuminating the recording surface with the second light directed through the transmission points by said step of directing and refracted by said step of refracting.

12. A method as set forth in claim 11, wherein said step of recording comprises the step of converting a quantity of the first light, directed through the transmission points by said step of directing and refracted by said step of refracting, into electric signals, representing the three-dimensional image, which are recorded; and wherein said step of reproducing comprises the step of converting the electric signals recorded by said step of recording into the quantity of light on the recording surface.

* * * * *

UNITED STATES PATENT AND TRADEMARK OFFICE
CERTIFICATE OF CORRECTION

PATENT NO.   :   5,678,095
DATED        :   October 14, 1997
INVENTOR(S)  :   TAKEZAKI It is certified that error appears in the above-identified patent and that said Letters Patent is hereby corrected as shown below:

Col. 1,   line 67, change "beames" to --beams--.

Col. 6,   line 50, change "ports" to --port--;
          lines 55-56, delete "portions of the".

Col. 9,   line 38, delete "of".

Signed and Sealed this

Seventeenth Day of February, 1998

Attest:

BRUCE LEHMAN

Attesting Officer                  Commissioner of Patents and Trademarks